Feb. 2, 1937.   J. G. PATRICK   2,069,621
METHOD OF CLEANING SAND FILTERS AND APPURTENANCES
Filed Dec. 7, 1935
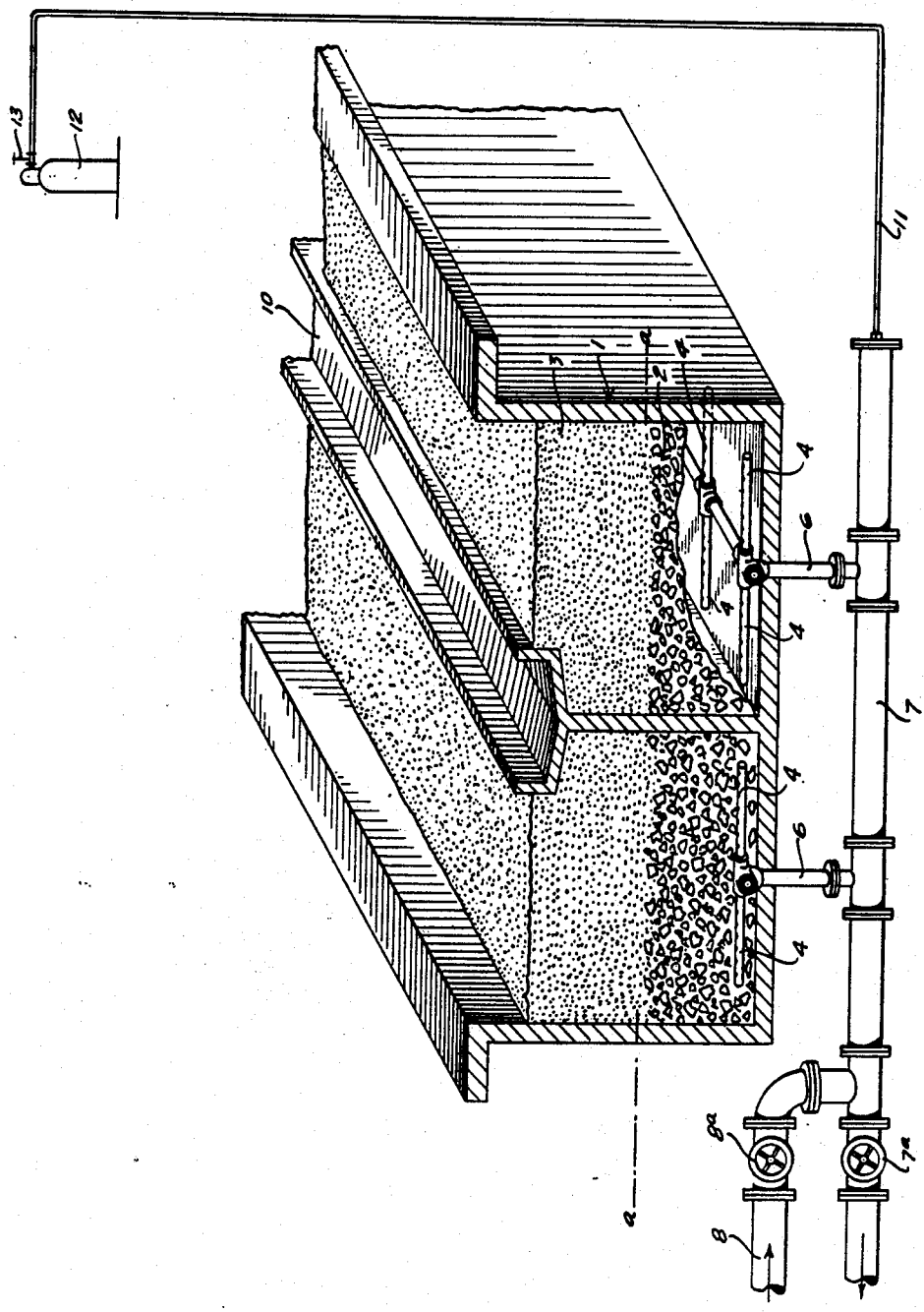
INVENTOR
JULIAN G. PATRICK
BY
ATTORNEY Patented Feb. 2, 1937

2,069,621

UNITED STATES PATENT OFFICE 2,069,621

METHOD OF CLEANING SAND FILTERS AND APPURTENANCES

Julian G. Patrick, Western Port, Md., assignor to West Virginia Pulp and Paper Company, New York, N. Y., a corporation of Delaware Application December 7, 1935, Serial No. 53,330

4 Claims. (Cl. 210—130)

My present invention relates to improvements in methods of cleaning water supplying systems including especially sand filters and the like and of appurtenances thereto. The cleaning of filters of this type used in water purification presents difficulties since many of the adhering foreign bodies are either not soluble in the usual water used for back washing nor are they easily dislodged by it. Also when the action of the wash water is relied upon to effect cleaning, it is often necessary to use water under considerable pressure to open up closed orifices of the drain pipes and when the closed jets are unstopped by the action of the water the sudden release of pressure causes displacement of sand and gravel and loss of sand.

I have now discovered that an effective cleaning action is had by the use of sulphur dioxide which, in dilute aqueous solution, i. e. as sulfurous acid, $H_2SO_3$ removes adhering deposits and incrustations without attacking the pipes or other iron work.

In carrying out my invention, I preferably add the sulphur dioxide from any suitable source desirably from a container in which the sulphur dioxide is stored in liquid form, mixing it in regulated quantities with a stream of water flowing in the reverse direction through the filter.

The invention will be best understood by reference to the following detailed description taken with the accompanying drawing, the single figure of which shows in cross section a water filter of conventional type in the process of being cleaned in accordance with my invention.

In the drawing 1 denotes the filter receptacle containing a layer of gravel 2 and of sand 3 below which is disposed a distributer system 4 for conveying away the filtered water, the water which is drained from such system being collected in down-take pipes 6 which in turn communicate with pipe 7. Also communicating with pipe 7 is pipe 8 admitting wash water to the filter pipes 7 and 8 being provided respectively with valves 7ª and 8ª. In the type of filter shown, the wash water may be collected in the trough 10, which has a suitable inclination to enable the water collecting therein to drain away.

The supply of $SO_2$ is preferably admitted to the system so as to be circulated with the back wash water and for this purpose may be admitted to the pipe 7 through pipe 11 (desirably of brass) leading from the tank 12, the flow of gas being regulated by means of valve 13.

In the operation of my improved method after the filters to be cleaned have been taken out of service and the tank 12 connected, the $SO_2$ is allowed to flow slowly into pipe 7. Previously a water level is established intermediate of the height of the filter as shown by the line a—a preferably by first draining the filter and then adding fresh water through the pipe 8 and valve 8ª. The gas is allowed to flow until a suitable concentration is had in the filter.

After the solution has been formed in the partly filled filter, the valve 13 is closed and the water level is raised to above the top of the sand by admitting wash water through pipe 8. After a suitable period depending upon particular circumstances including the concentration of $SO_2$ in the solution, as for example four and one half to five hours more or less, the reaction is complete whereupon the solution may be removed by admitting wash water through pipe 8 thereby causing the spent solution to be washed into the wash water trough 10; desirably the wash is repeated two or three times or as often as necessary. If necessary, the $SO_2$ treatment and washing operations may be repeated. In carrying out the process, the formation of the $SO_2$ solution may be hastened somewhat by causing the liquid sulphur dioxide to flow into the water in the filter as by turning the cylinder 12 upside down.

The concentration of $SO_2$ in the water filling the filter may be varied considerably. In practice I have found a concentration as high as 3% to give rapid cleaning action without causing appreciable corrosion of the metal piping. Ordinarily, however, I prefer to use a much weaker concentration as for example as low as .02%.

While not wishing to be bound by its correctness, my explanation of the cleaning action of the sulfurous acid is that first of all it acts by virtue of its acid and reducing properties as a solvent for the hydrated manganese dioxide ($H_2MnO_3$) the ferric hydroxide and for the accretions formed by the so-called iron bacteria etc. which substances I have found to constitute the bulk of the coating on the sand grains, gravel and the interior of the under drain pipes. The hydrated manganese dioxide is thereby reduced to bivalent manganese which combines with the oxidized sulfurous ion to give manganese sulphate. Similarly the sulfurous acid, a portion of which becomes oxidized by the dissolved oxygen in the water dissolves the ferric hydroxide to form soluble ferric sulphate. Moreover, the acid condition of the water kills the iron bacteria and thus aids in the removal of the accretions formed by them. It will be noted that while free $H_2SO_4$, a strong acid, is formed, its formation is gradual by the action of the dissolved oxygen and thus is not formed in greater quantities than can be absorbed by the iron and other compounds. The manganese compounds heretofore have been the most difficult to remove since they are not attacked by the action of dilute acids or alkalis in the form in which they occur but must first undergo reduction.

My improved method is also effective in breaking up rather large accretions known as mud balls which are apt to form in sand filters used in water purification after several months of service. In these accretions, the sand particles which also include some of the precipitate or floc filtered out of the water, are bound together by the insoluble manganese, iron and lime compounds etc. These mud balls by reason of their high gravity work below the sand level of the filter and after a heavy draw on the filter, release their entrained floc thereby causing the filtered water to be turbid. The action of the sulfurous acid effectively breaks up these accretions and allows the floc to be washed out.

While my invention is of particular usefulness in cleaning sand filters, it is also useful in removing insoluble deposits of similar nature occuring in various parts of water distributing systems.

Furthermore, while I have described a specific manner of applying the sulphur dioxide, I do not wish to be limited to this as many other modes of application will occur to those skilled in the art.

I claim:

1. The method of removing deposits containing hydrated manganese oxide in water treating and distributing systems which consists in treating said deposits with a dilute aqueous solution of $SO_2$.

2. The method of cleaning sand filters used in water purification which consists in treating same with an aqueous solution of $SO_2$.

3. The method of cleaning sand filters used in water purification which consists in back flowing thereinto a dilute solution of $SO_2$ and removing the solution after the action thereof is complete.

4. The method of treating sand filters and the like which consists in establishing a water level intermediate of the height of the filters, adding $SO_2$ to the water therein, then adding water by back flowing same to bring the water level to at least the level of the sand and then after the action of the $SO_2$ solution is complete, removing the solution.

JULIAN G. PATRICK.